United States Patent
Patton

(10) Patent No.: US 7,997,190 B2
(45) Date of Patent: Aug. 16, 2011

(54) DUAL FORCE RAM DRIVE FOR A SCREW PRESS

(75) Inventor: Roger B. Patton, North Wales, PA (US)

(73) Assignee: PEM Management, Inc., Wilmington, DE (US)

( * ) Notice: Subject to any disclaimer, the term of this patent is extended or adjusted under 35 U.S.C. 154(b) by 394 days.

(21) Appl. No.: 12/207,925

(22) Filed: Sep. 10, 2008

(65) Prior Publication Data

US 2009/0071351 A1  Mar. 19, 2009

Related U.S. Application Data

(60) Provisional application No. 60/972,447, filed on Sep. 14, 2007, provisional application No. 60/972,436, filed on Sep. 14, 2007.

(51) Int. Cl.
*B30B 1/18* (2006.01)

(52) U.S. Cl. .......................... 100/289; 100/48; 74/89.23

(58) Field of Classification Search .............. 100/43, 100/48, 230, 257, 271, 273, 274, 289; 72/20.2, 72/441, 443, 454; 74/89.23, 89.28, 89.29
See application file for complete search history.

(56) References Cited

U.S. PATENT DOCUMENTS

| | | | |
|---|---|---|---|
| 4,968,239 A * | 11/1990 | Inaba et al. | 425/150 |
| 5,431,372 A | 7/1995 | Kostelecky | |
| 5,487,215 A | 1/1996 | Ladouceur | |
| 5,488,880 A | 2/1996 | Sartorio | |
| 5,533,250 A | 7/1996 | Ladouceur | |
| 5,557,154 A | 9/1996 | Erhart | |
| 5,829,347 A | 11/1998 | Hiruma | |
| 6,520,077 B1 | 2/2003 | Minagawa | |
| 6,544,026 B1 | 4/2003 | Stocksiefen | |
| 6,679,164 B2 | 1/2004 | Futamura | |
| 6,990,896 B2 | 1/2006 | White | |
| 7,024,270 B2 | 4/2006 | Mauer | |
| 7,032,296 B2 | 4/2006 | Zdravkovic | |
| 7,123,982 B2 | 10/2006 | Mauer | |
| 7,284,407 B2 * | 10/2007 | Imaeda | 72/443 |
| 2005/0145117 A1 | 7/2005 | Du | |
| 2005/0204798 A1 | 9/2005 | Imaeda | |

* cited by examiner

*Primary Examiner* — Jimmy T Nguyen

(74) *Attorney, Agent, or Firm* — Gregory Gore & Associates

(57) ABSTRACT

Precise motion of the ram of a fastener press is controlled by high torque and low torque motors for high speed/low force and high force pressing of the ram by the ram, respectively. The high torque motor means drive passes through a bidirectional overrunning clutch. The clutch is controlled by the relative motion of the two separate motor drive speeds of which are regulated by a controller. The clutching motion is therefore controlled only by the relative speed of its drive versus driven components. This provides an extremely smooth and responsive transition between high speed/low force and low speed/high force operation of the ram so that the pressing cycle can be as fast and efficient as possible.

5 Claims, 4 Drawing Sheets

Outer hub and Inner hub shaft not shown

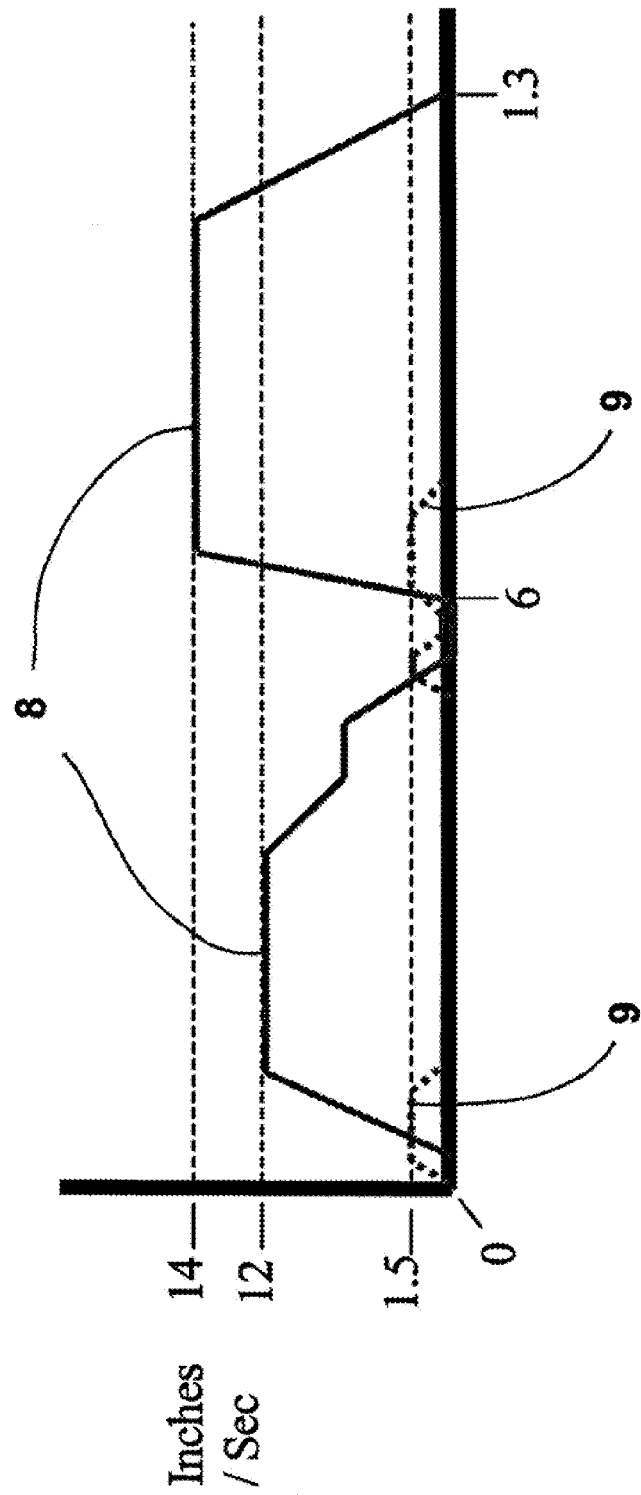

DUAL FORCE RAM DRIVE FOR A SCREW PRESS

RELATED APPLICATION

This patent application is related to provisional patent application Ser. No. 60/972,436 entitled "Setup System for a Fastener Press" filed on Sep. 14, 2007 and provisional patent application Ser. No. 60/972,447 entitled "Dual Force Ram Drive for a Screw Press" filed on Sep. 14, 2007, priority from which is hereby claimed.

FIELD OF THE INVENTION

This invention relates to a fastener press which utilizes electric servo motors for precise ram position control. More specifically, the present invention relates to a servo motor driven ram having separate high-force and low-force drive motors using a clutch-type drive mechanism and regulated by a controller.

BACKGROUND OF THE INVENTION

The desirable characteristics of a fastener insertion press are high speed and high force. To achieve these characteristics a single drive unit is impractical as high cost, large power requirements, and large physical size are restrictions. However, a press motion profile with a high speed approach to the pressing position and then an insertion press to a high force at slower speeds provides a solution.

To achieve this motion profile, presses utilize a two-motor servo system to control velocity, position, and force of the press ram to install fasteners to the proper force or distance depending on the application. A high torque drive is engaged to drive the ram to the desired force or position. After insertion the high speed motor returns the ram to the home position.

There is therefore a need in the art for a ram drive in a press which provides both high speed and high force accurately and reliably. There is a further need for an accurate and reliable ram drive and press which is economical to manufacture and does not require significant operator skill.

SUMMARY OF THE INVENTION

In order to meet the needs of the art described above, the present invention has been devised. A fastener press, for example a Pemserter Series 3000 manufactured and sold by Penn Engineering and Manufacturing Corp., as shown in FIG. 1, utilizes a bidirectional over-running clutch through which high force ram drive power passes. The clutch is controlled by relative motion of two separate motor drives as will be described in detail below. Bidirectional over-running clutches are commercially available components that consist of a regular, polygon-shaped inner hub surrounded by rollers encased in an outer hub as shown in FIG. 3. The inner and outer hubs are connected to separate shafts. The inner hub shaft can drive the outer hub shaft in either a clockwise or counterclockwise direction if the inner hub shaft speed of rotation is greater than the outer hub. If the outer hub speed is greater than the inner hub then the clutch is disengaged and the outer hub can rotate independently of the inner hub. The clutching action is therefore controlled only by the relative speed of its drive versus driven components. This provides an extremely smooth and responsive transition between high speed/low force and low speed/high force operation of the ram so that the pressing cycle can be as fast and efficient as possible. These structures may be used with the setup system for a fastener press disclosed in provisional patent application Ser. No. 60/972,436 of the same Applicant.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5 is a graph showing the pressing profile of one embodiment of the invention depicting the speed of the ram over time.

DESCRIPTION OF THE PREFERRED EMBODIMENT

Figure 1:
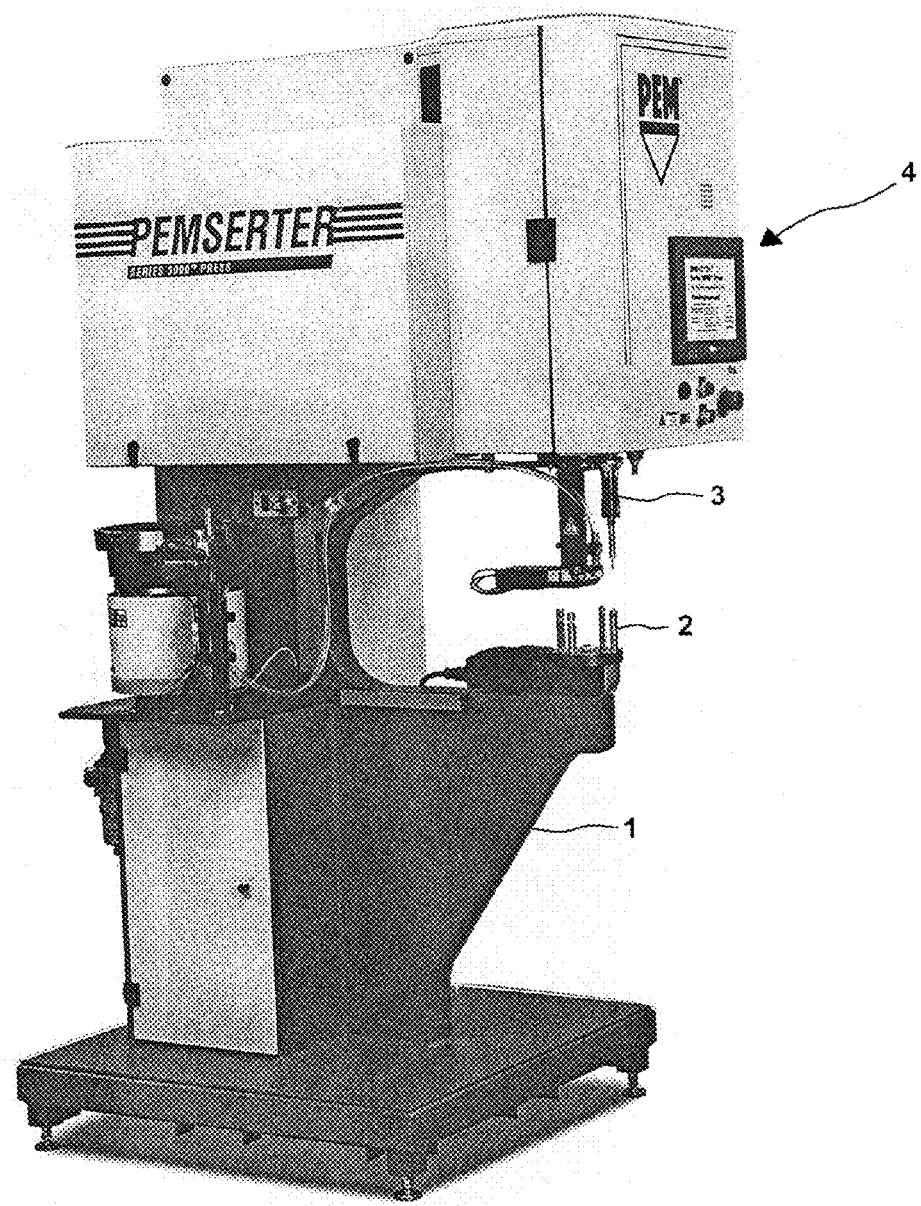
FIG. 1 is a front left isometric view of a ram press utilizing the invention.

Referring now to FIG. 1, a ram press 4 employing the invention is shown which includes a c-shaped frame 1 that supports an anvil 2 that is reciprocally impacted by ram 3.

Figure 2:
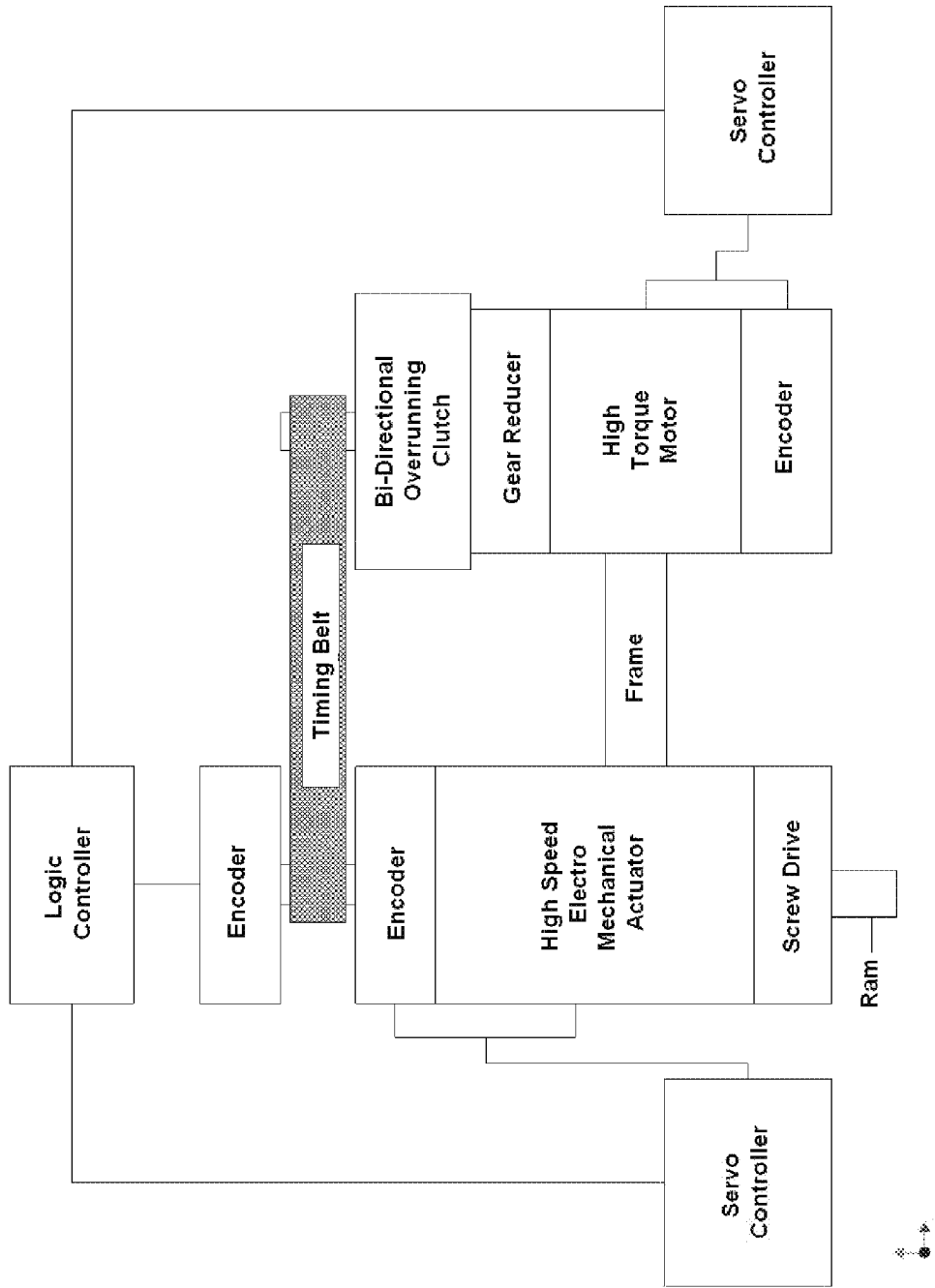
FIG. 2 is a diagram showing the major components of the invention.

Referring now to FIG. 2, major components of the invention are disclosed which comprise a frame that supports basic mechanical components of the invention that comprise a high-speed mechanical actuator and a high-torque motor. Also supported by the frame, is a screw drive which may be operated in either direction by either the high-speed or low-speed motor means. A bidirectional self-disengaging clutch is connected to the high torque motor means which includes a motor/gear reducer combination. A programmable logic controller regulates operation of the two motors and thus movement of the ram by way of the screw drive. The bidirectional clutch is connected to the main shaft of the screw drive by way of a timing belt. The logic controller regulates the movement of the ram according to a pressing profile that will be described in more particularity with regard to FIG. 5.

With continued reference to FIG. 2, the press ram is moved by a screw actuator whose shaft is coupled directly to the high speed motor means in this embodiment being the commercially available device generally referred to as an electromechanical actuator. The device incorporates a screw drive mechanism so that its internal shaft is reciprocated in a range of motion between extended and retracted positions. That drive shaft is also coupled to the output of the above-described clutch by way of a gear belt drive. The input shaft of the clutch is coupled to the high torque motor. The clutch is operated by the relative speeds of separate brushless DC or AC servo motors that are regulated by a controller. Each motor has a feedback device such as an encoder or resolver and an additional encoder is attached to the main actuator shaft so that the relative position of the ram is known regardless of which motor is operating the ram. One motor provides a high-speed drive while the second motor is a high-torque drive which is an integrated servo gear motor with a 10 to 1 ratio. The high-torque motor means has its own encoder for communication and control and its output shaft is coupled to the high-speed motor's drive shaft through the above-described high-torque clutch, transmitted there by a belt. The high-torque motor can rotate the screw actuator when the clutch is engaged. Engagement of the clutch is achieved by regulating the speeds of the motors to switch ram operation from one motor to the other when the other is running faster.

Figure 3:
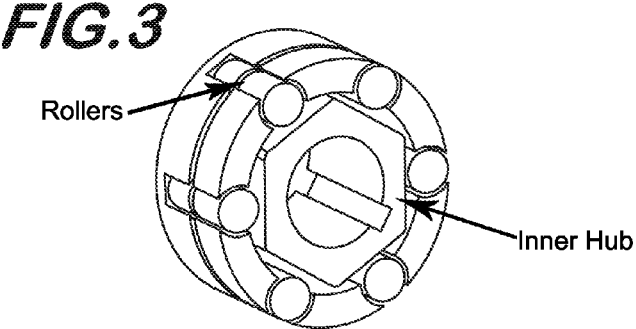
FIG. 3 is a top front left isometric view of the bidirectional clutch of the invention.
Figure 4:
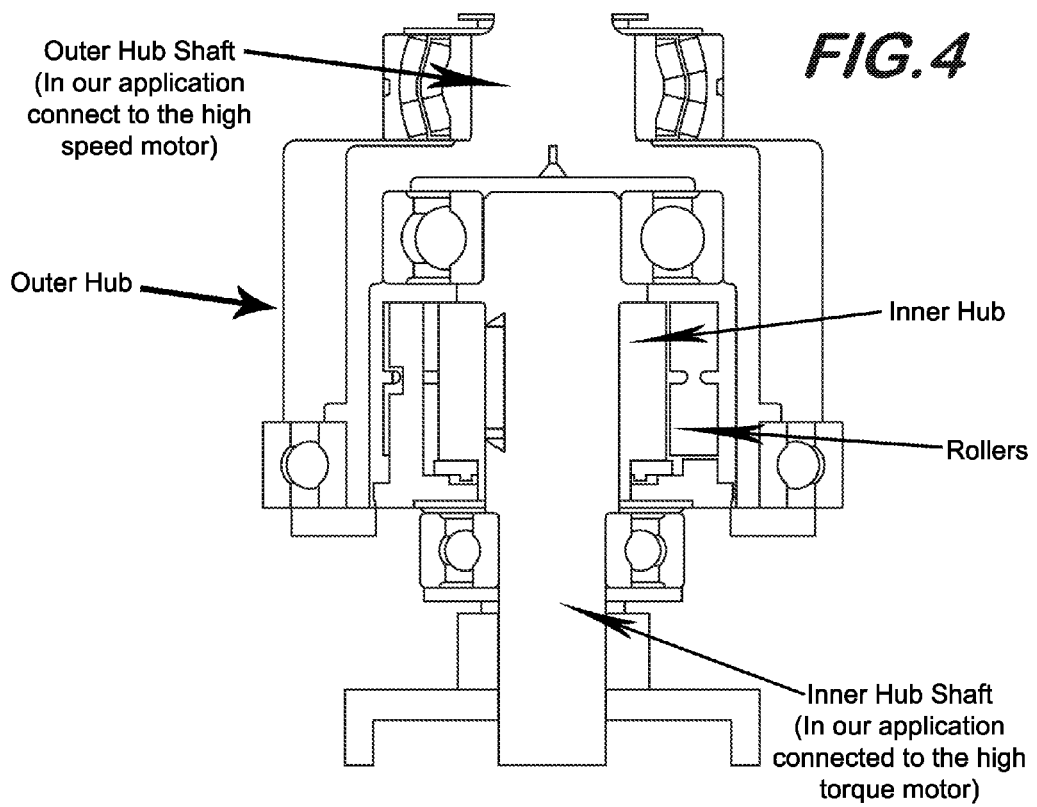
FIG. 4 is a elevation cross-sectional view of the bidirectional clutch of the invention.

Referring now to FIGS. 3 and 4, the bidirectional clutch of the invention is a commercially available device well known in the mechanical arts. FIG. 4 is a cross-sectional view of the bidirectional clutch describing greater details of its structure. The outer hub shaft carries the output of the clutch and is interconnected to the high speed motor shaft by way of a belt drive as depicted in FIG. 2. The inner hub shaft is connected to a high torque output of the gear motor.

Operation

The required movements of the ram can be described by four stages:

1. High-speed down for set up or up for home position;
2. Upward high-speed movement after any move not requiring high-force;
3. High-force pressing; and
4. Upward movement after high force pressing One embodiment of the invention may be described in detail as follows. The four stages of movement required of the ram described above are specifically carried out in the following steps for each movement, as follows:

1. Sequence to move high speed axis down for setup and up to home position
   a. Enable high speed servo drive, it will hold position
   b. Enable high torque
   c. Bump high torque axis +0.015" to ensure clutch is free
   d. 0.050 seconds into the move, enable high speed axis
   e. Run high speed axis down while high torque is finishing its move
   f. Disable high torque
2. Sequence to move high speed axis up after any move not requiring the high torque axis for force:
   a. High speed is enabled, since it just ran down
   b. Enable high-torque
   c. Bump high torque axis −0.015" to ensure clutch is free
   d. 0.050 seconds in to the move, enable high speed axis
   e. Run high speed axis up while high torque is finishing its move
   f. Disable high torque
3. Sequence to engage the clutch for pressing with the high torque axis:
   a. Enable high speed servo drive—it will hold position
   b. Enable high torque
   c. Bump high torque axis +0.015 to ensure clutch is free
   d. High speed axis is moving down, two moves are compounded together (registration move and collapse move)
   e. Logical decisions are made on the fly to ensure the ram sensor tripped within a proper window and other conditions were satisfied
   f. While high speed axis is moving, enable high torque
   g. Start high torque axis moving approximately 0.650" above workpiece—it is running at a slower speed than the high speed axis, so ram is still being driven at 8 IPS by high speed axis while high torque is turning at a speed significantly less than this speed (0.80-1.6 IPS)
   h. High torque takes over ram movement as high speed axis is decelerating to zero
   i. High speed axis finishes its move and disables
   j. Run high torque axis down to complete pressing based on strain gauge input
4. Sequence to disengage the clutch after pressing with the high torque axis:
   a. After high torque axis completes all pressing and dwell, calculate disengage distance based on the force, to unload the force exerted on the clutch which would cause back driving of the ram.
   b. Move high torque axis −.XXX distance=(Force/16000)*−0.150
   c. Keep high torque enabled
   d. Re-enable high speed axis The above movements are regulated by a controller which determines the speeds of the high speed and high torque motors which, in combination with the clutch of FIG. 2 interposed between the high torque motor and the screw actuator, follows a prescribed pressing profile that determines the motion of the ram.

FIG. 5 represents a typical pressing profile. The X axis represents time in seconds and the Y axis represents speed (inches per second) The dotted lines 9 indicate the typical motion of the high torque motor and the solid lines 8 represent the motion of the high speed motor as it relates to ram movement. At the beginning of the process the first move is to start the high torque motor prior to starting the high speed motor. This move insures that the clutch will disengage when the high speed motor overtakes the high torque motor. When the solid line crosses the dotted line (reading from left to right) the high speed motor overtakes the high torque motor and is then in control of the ram. The high torque motor then decelerates and stops during the high speed move. At the mid point of the graph the high speed move (solid line) is approaching the pressing position. At this time the high torque motor starts accelerating while the high speed motor is decelerating. When the dotted line overtakes the solid line the high torque motor is in control and the pressing sequence begins. Once pressing is complete the high torque motor decelerates. On the return stoke after pressing, the high torque motor is started in reverse and begins to accelerate. The high speed motor then starts and begins to accelerate at a faster rate. When the solid line crosses the dotted line the high speed motor overtakes the high torque motor and is in control. The high speed motor finishes the move and decelerates to a stop. The cycle is complete and ready for the next cycle.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A drive for a ram press, comprising:
   a frame;
   screw drive means mounted to said frame, said drive means being selectively rotatable in opposite directions by first motor means;
   a ram mounted to said screw drive reciprocal in a range of motion between extended and retracted positions;
   second motor means connected to said screw drive means for rotation thereof;

a bidirectional, self-disengaging clutch having an input shaft connected to said second motor means and an output shaft connected to said screw drive means whereby the clutch disengages whenever said output shaft is driven at a speed greater than the speed of input shaft; and a programmable logic control system for regulating the position of the ram by operation of said first motor means and said second motor means whereby said first motor means is signaled to rotate said screw drive at a higher rate of speed relative to said second motor means during a fast movement phase of moving said ram, said clutch being disengaged thereby.

2. The drive of claim 1 wherein said clutch is engaged when said control system signals said first motor to operate at a speed less than said second motor means whereupon said ram is moved by said second motor means during a high force phase of moving said ram.

3. The drive of claim 1 further including means for sensing the position of said ram electrically connected to said logic control system.

4. The drive of claim 1 wherein said first motor means is a high speed low torque motor and said second motor means comprises a gear reducer interposed between a high torque motor of said second motor means and the input shaft of said clutch whereby said clutch input shaft is driven at a high torque and a low speed.

5. The drive of claim 1 wherein both first and second motor means always rotate said drive screw in the same direction when both motor means are simultaneously operative.

* * * * *